(12) United States Patent
Blank et al.

(10) Patent No.: US 12,504,954 B2
(45) Date of Patent: Dec. 23, 2025

(54) EDITING OF A MULTI-PAGE DEMO

(71) Applicant: Walnut Ltd., Tel Aviv (IL)

(72) Inventors: Oren Blank, Hod Hasharon (IL); Jaap Frolich, Zeist (NL); Leandro Ostera, Stockholm (SE); Diogo Mafra, Uberlândia (BR); Yaroslav Muliar, Madeira (PT); Lior Dvora, Kiryat Ono (IL); Assaf Cohen, Ramot HaShavim (IL); Nir Benita, Tel Aviv (IL)

(73) Assignee: WALNUT LTD., Tel Aviv (IL)

( * ) Notice: Subject to any disclaimer, the term of this patent is extended or adjusted under 35 U.S.C. 154(b) by 325 days.

(21) Appl. No.: 18/154,940

(22) Filed: Jan. 16, 2023

(65) Prior Publication Data

US 2024/0241699 A1     Jul. 18, 2024

(51) Int. Cl.
*G06F 8/34* (2018.01)

(52) U.S. Cl.
CPC ..................................... *G06F 8/34* (2013.01)

(58) Field of Classification Search
CPC ........................................................ G06F 8/34
USPC ........................................................ 717/110
See application file for complete search history.

(56) References Cited

U.S. PATENT DOCUMENTS

| | | | | |
|---|---|---|---|---|
| 10,659,566 | B1* | 5/2020 | Luah | H04L 67/01 |
| 11,726,804 | B1* | 8/2023 | Guruswamy | G06F 8/34 |
| | | | | 715/705 |
| 2007/0162845 | A1* | 7/2007 | Cave | G06F 40/117 |
| | | | | 715/764 |
| 2012/0204102 | A1* | 8/2012 | Gwin | G06F 40/186 |
| | | | | 715/253 |
| 2020/0233628 | A1* | 7/2020 | He | G06F 9/445 |
| 2021/0042133 | A1* | 2/2021 | McIntyre | G06F 11/3476 |
| 2021/0150263 | A1* | 5/2021 | Corwin | G06F 16/148 |
| 2023/0021745 | A1* | 1/2023 | Miller | G06F 40/143 |
| 2023/0114651 | A1* | 4/2023 | Bar Hakim | G06F 16/953 |
| | | | | 707/706 |
| 2024/0311557 | A1* | 9/2024 | Tiberg | G06F 40/14 |
| 2025/0021692 | A1* | 1/2025 | Bachar | G06F 21/6254 |
| 2025/0036886 | A1* | 1/2025 | Lee | G06F 40/40 |

* cited by examiner

*Primary Examiner* — Wei Y Mui
*Assistant Examiner* — Amir Soltanzadeh

(57) ABSTRACT

A method, system, apparatus and product for editing a multi-page demo. The multi-page demo includes at least two shallow copies of pages of a web-based system. A multi-page demo editor may create, in response to an operator instruction, an aggregated object that may appear in two or more shallow copies. The aggregated object may be associated with objects in two shallow copies, and customization instructions by the operator provided once with respect to the aggregated object may be applied two or more times on associated objects in the two or more shallow copies. In some cases, the multi-page demo may be updated so as to apply the customization of the aggregated object on a first object in a first shallow copy and on a second object in a second shallow copy.

20 Claims, 13 Drawing Sheets

EDITING OF A MULTI-PAGE DEMO

TECHNICAL FIELD

The present disclosure relates to editing functionalities of a set of documents, in general, and to improved editing functionalities of a set of documents of web-based systems, in particular.

BACKGROUND

Web-based systems (also referred to as Software as a Service, or "SaaS", products) are commonly used today. Such systems utilize linked documents, e.g., HyperText Markup Language (HTML), to allow the user to navigate through the system using a browser. In some cases, the browser may be an off the shelf browser (e.g., Chrome™, Edge™, FireFox™, or the like), a customized or dedicated browser, an in-app browser, a headless browser (e.g., headless Chrome™), or the like.

It is noted that while the present disclosure relates to "web-based" systems, such systems may be implemented without the use of the world wide web (www), and instead be implemented using on-prem local network, such as in the case of organization with a separate infrastructure, who may prefer to limit accessibility to the Internet.

SaaS products may comprise backend and frontend, which may interact with one another. In some cases, the frontend may be implemented by the browser that is executed on the user's device, displaying the Graphical User Interface (GUI) to the user. The backend may be implemented at the server, which may receive user requests from the client, and transmit responses thereto. In some cases, the backend may serve linked documents, such as web pages, to be presented by the browser at the client's device.

BRIEF SUMMARY

One exemplary embodiment of the disclosed subject matter is a method comprising obtaining a multi-page demo, the multi-page demo comprising a plurality of shallow copies of pages of a web-based system, the plurality of shallow copies of the page of the web-based system are copies of the pages of the web-based system that were stripped from links to a backend of the web-based system, the plurality of shallow copies comprises a first shallow copy and a second shallow copy; in response to an operator instructing to create an aggregated object in the multi-page demo, creating the aggregated object, the operator utilizing a demo editor to edit the multi-page demo; associating the aggregated object with a first object appearing in the first shallow copy and a second object appearing in the second shallow copy; obtaining a customization instruction of the operator with respect to the aggregated object; updating the multi-page demo so as to apply the customization of the aggregated object on the first object and on the second object.

Optionally, the first shallow copy is a shallow copy of a first page, wherein the second shallow copy is a shallow copy of a second page, wherein the first page and the second page are defined based on unified code that defines the first object and the second object.

Optionally, the first page and the second page do not exhibit the fact that the first object and the second object are instances of the same object defined in the unified code.

Optionally, the method comprises: displaying the first shallow copy; acquiring the first object in the first shallow copy; and applying the customization of the aggregated object on the acquired first object.

Optionally, the method comprises: displaying the second shallow copy; acquiring the second object in the second shallow copy; and applying the customization of the aggregated object on the acquired second object.

Optionally, said acquiring the first object and said acquiring the second object are performed using a different acquisition process.

Optionally, the demo editor is configured to define one or more acquisition methods for the aggregated object.

Optionally, the demo editor is configured to define for the first shallow copy an acquisition method to be performed when acquiring the first object in the first shallow copy, wherein the acquisition method is determined after the demo editor utilizes the acquisition method successfully on the first shallow copy.

Optionally, the demo editor is configured to define for the second shallow copy a second acquisition method to be performed when acquiring the second object in the second shallow copy, wherein the second acquisition method is determined after the demo editor utilizes the acquisition method unsuccessfully on the second shallow copy and after the demo editor utilizes the second acquisition method successfully on the second shallow copy.

Optionally, said acquiring is performed using at least one of: an XML Path Language (XPath) statement, and a Cascading Style Sheets (CSS) Selector.

Optionally, said applying comprises: performing one or more object-specific updates that are associated with the aggregated object, wherein the one or more object-specific updates are applicable on all pages in which the aggregated object appears.

Optionally, the method comprises applying customization on one or more objects of the first shallow copy based on customization instructions provided by the operator using the demo editor, wherein said applying the customization on the one or more objects comprises performing one or more page-specific updates that are associated with the first shallow copy.

Optionally, the demo editor is configured to display an active page, thereby enabling the operator to customize elements of the active page, wherein the demo editor is configured to display a visual indicator indicating to the operator that an element of the active page is associated with the aggregated object.

Another exemplary embodiment of the disclosed subject matter is a system comprising a processor and coupled memory, wherein said system comprises: a demo editor that is usable by a operator to edit a multi-page demo, the multi-page demo comprising a plurality of shallow copies of pages of a web-based system, the plurality of shallow copies of the page of the web-based system are copies of the pages of the web-based system that were stripped from links to a backend of the web-based system, the plurality of shallow copies comprises a first shallow copy and a second shallow copy; said demo editor is configured to create an aggregated object in the multi-page demo in response to an operator instruction to create the aggregated object; said demo editor is configured to associate the aggregated object with a first object appearing in the first shallow copy and with a second object appearing in the second shallow copy; said demo editor is configured to receive one or more customization instructions from the operator to customize the multi-page demo, the one or more customization instructions comprise a customization instruction with respect to the aggregated object; said demo editor is configured to update the multi-page demo so as to apply the customization of the aggregated object on the first object and on the second object.

Optionally, the first shallow copy is a shallow copy of a first page, wherein the second shallow copy is a shallow copy of a second page, wherein the first page and the second page are defined based on unified code that defines the first object and the second object.

Optionally, said demo editor is configured to enable the operator to select an active page to be displayed, wherein in response to an operator selection of the first shallow copy, said demo editor is configured to: acquire the first object in the first shallow copy, apply the customization of the aggregated object on the acquired first object, display to the operator, the first shallow copy with a customized first object, and enable the operator to further customize the first shallow copy and the aggregated object; wherein in response to an operator selection of the second shallow copy, said demo editor is configured to: acquire the second object in the second shallow copy, apply the customization of the aggregated object on the acquired second object, display to the operator, the second shallow copy with a customized second object, and enable the operator to further customize the second shallow copy and the aggregated object.

Optionally, said demo editor utilizing an acquisition module for acquiring objects, wherein said acquisition module is configured to acquire the first object and the second object using different acquisition processes.

Optionally, said acquisition module is configured to attempt acquisition of objects that correspond to the aggregated object by utilizing a plurality of acquisition processes defined with a deterministic order therebetween.

Optionally, the system comprises a demo engine configured to play the multi-page demo, the demo engine is configured to apply a first set of one or more updates when displaying the first shallow copy and a second set of one or more updates when displaying the second shallow copy, wherein the first set of one or more updates comprise one or more page-specific updates associated with the first shallow copy and one or more object-specific updates associated with the aggregated object, wherein the second set of one or more updates comprise one or more page-specific updates associated with the second shallow copy and the one or more object-specific updates that are associated with the aggregated object.

Optionally, said demo editor may create duplicative copies of the one or more object-specific updates to be utilized by said demo engine, wherein said demo engine is unaware of a logical association between different implementations of the same aggregated object in different pages when playing the multi-page demo.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
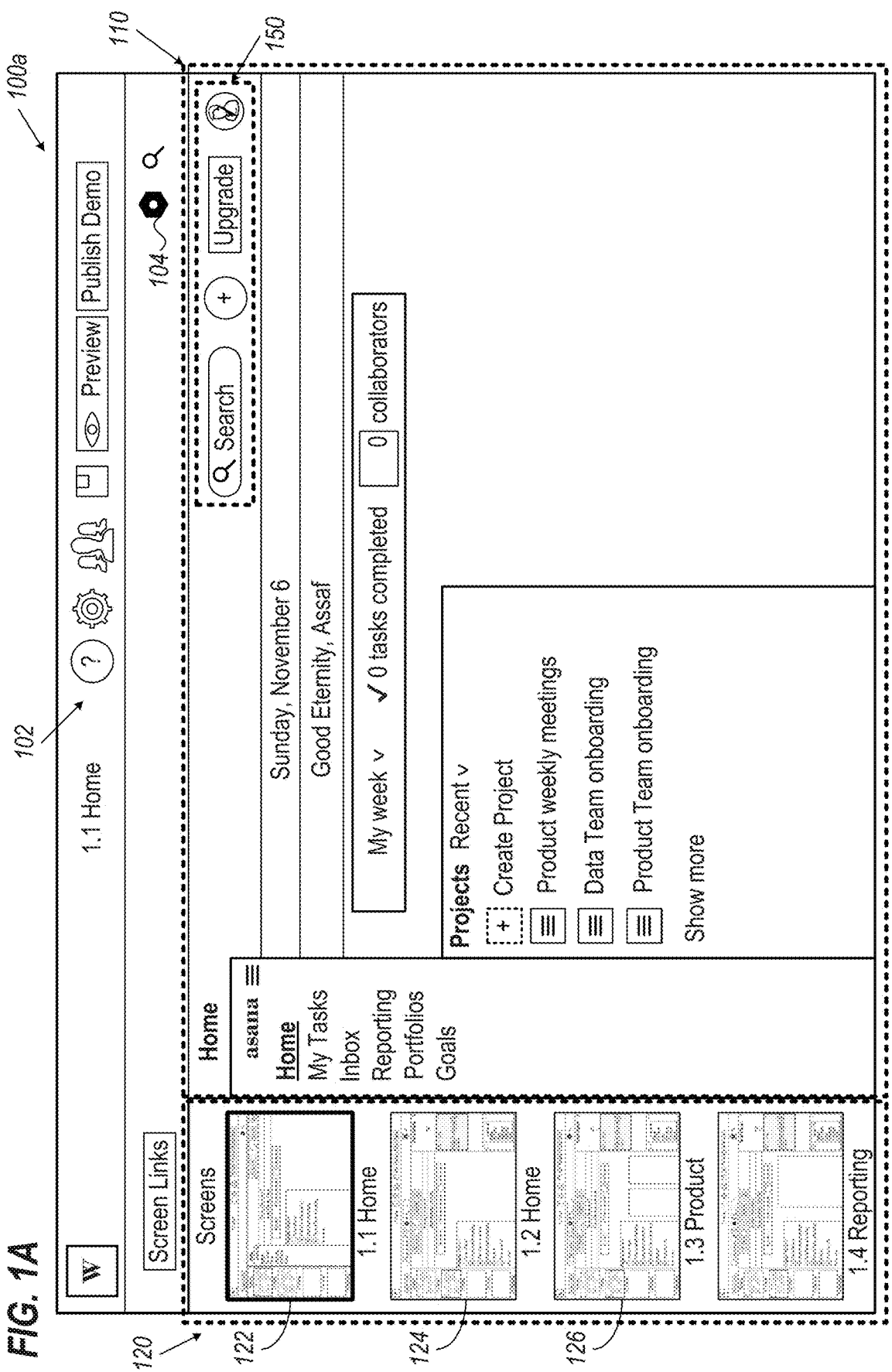
FIGS. 1A-1J show screenshots of systems, in accordance with some exemplary embodiments of the disclosed subject matter.
Figure 1B:
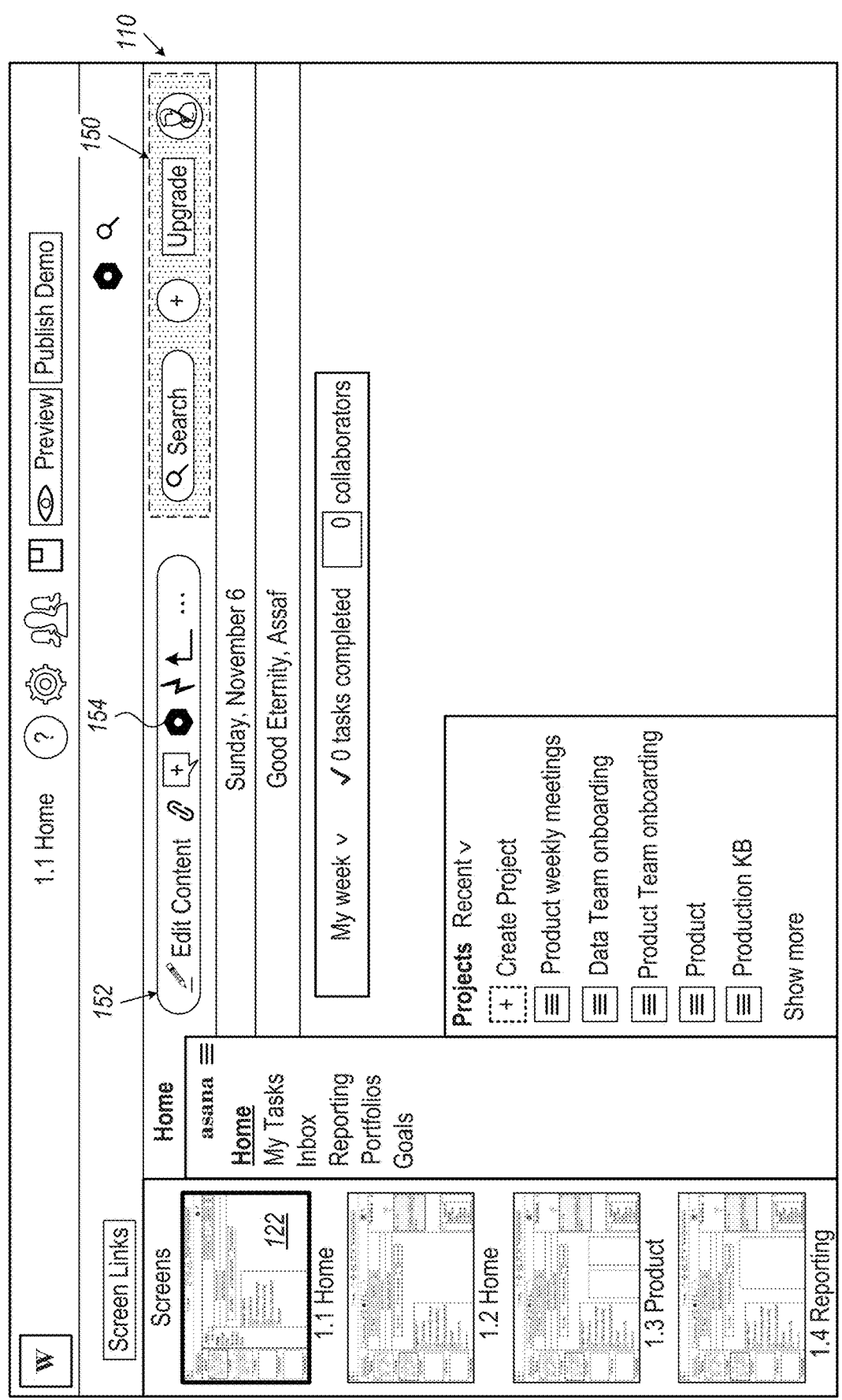
Figure 1C:
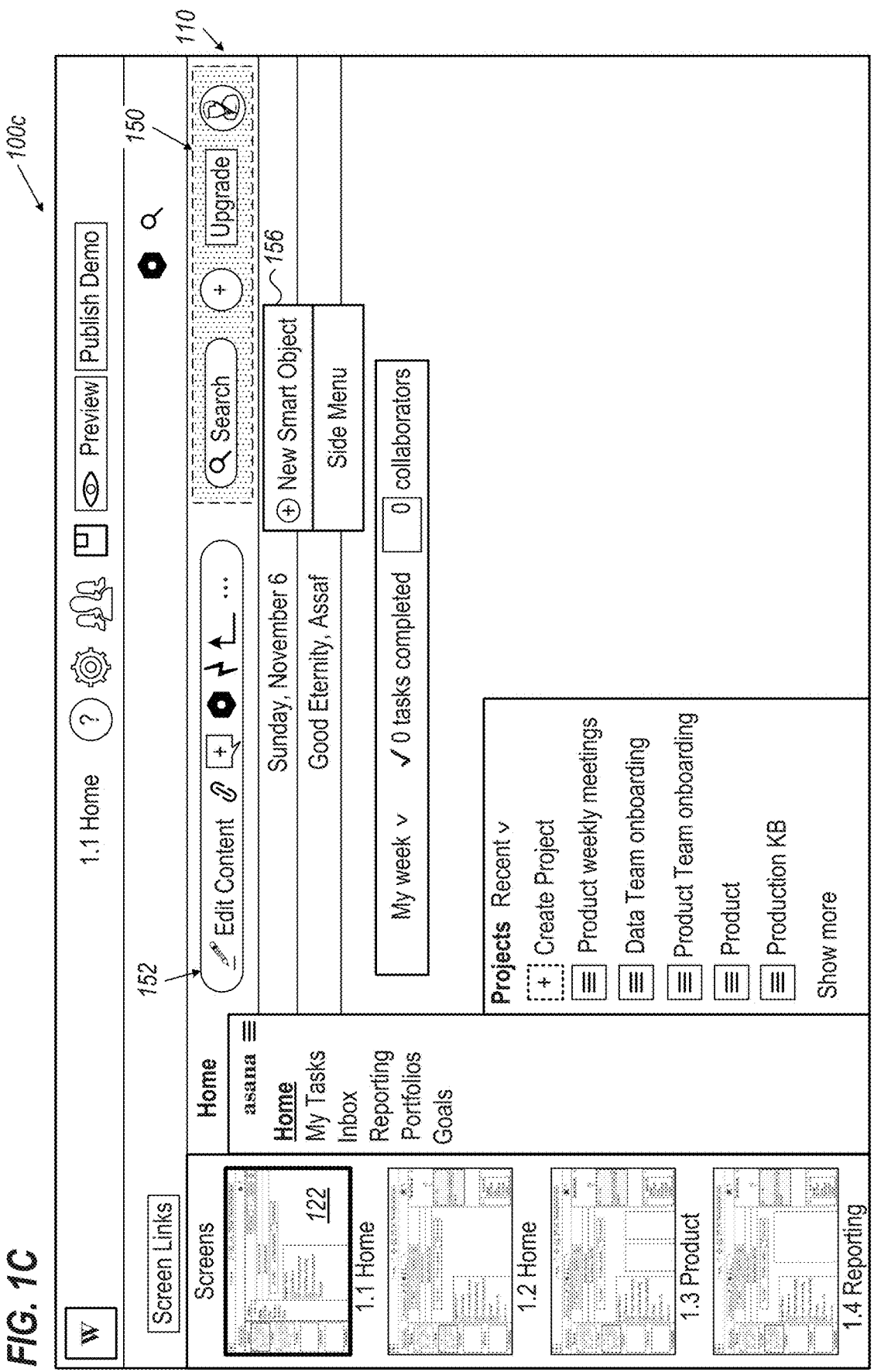

One technical problem dealt with by the disclosed subject matter is to provide a platform for presenting demonstrations ('demos') of web-based systems, products, or the like, without relying on a real time execution of the web-based system. For example, a demo of a web-based product may be provided to one or more potential clients. In some exemplary embodiments, providing a demo to potential clients of Software as a Service (SaaS) products may be part of a sale activity. In some cases, demonstrating capabilities of the SaaS product using the SaaS product itself, such as by executing one or more functionalities of the product, may be disadvantageous, at least since the SaaS product may exhibit a bug while the demo is shown, may exhibit sensitive information of a specific client, or the like. For example, while the demonstration of the product is being shown to potential clients, the backend may crash, and may not respond to a query sent from the frontend. As yet another example, recent changes in the user interface or functionality, may interrupt the flow of the demonstration, such as the case if the salesperson is unable to find a new location of a button that was recently moved. In some cases, the potential client may point to a specific feature and request it be demonstrated, although the feature may not be part of the outline prepared by the salesperson, or may not be part intended by the salesperson to be provided to the potential client. It may be desired to overcome such drawbacks, such as by demonstrating the product without executing functionalities of the web-based system.

Another technical problem dealt with by the disclosed subject matter is to provide a customized demonstration of the product, e.g., a customized demo presentation. For example, the salesperson may wish to change colors, logos and other visual features of the web-based system to provide a better demonstration of the system to a potential customer. Such changes may be desired to be performed with respect to the potential customer, but it may not be desired that such changes will affect other users or actual customers. The desired customization may include changing actual data points used by the web-based system, such as changing the names shown in the system from real names to dummy names, removing real financial value, or the like. Such customization may be desired to be performed without requiring changes in the data repository itself. It is noted that creating a dummy repository from scratch may be a time-intensive task, as opposed to modifying values of a pre-existing data from a real repository.

Yet another technical problem dealt with by the disclosed subject matter is to provide for editing capabilities that would allow to update a same object appearing in several documents in an efficient manner. While the web-based system may be based on unified code, the created documents that are served may be disconnected from one another and the logical connection of several pages implementing the same object may not exist when viewing the documents themselves. Additionally, or alternatively, the unified code may exist when the pages are served, but the logical connection may not persist when shallow copies are created, as the shallow copies of the pages may be created based on a per-screen basis. In some cases, the unified code may not be captured.

Consider a web-based system in which a server generates a web page in response to client queries. The server may utilize the same code (e.g., using an "include" command, by re-using the same header, based on a programmatic instruction, or the like) to generate the same element in different pages. For example, a top-page menu may be generated using the same code. As another example, a footer element may appear in all pages of the same web-based system, but may be coded in a single code fraction that is reused by the server. As another example, a page may be generated using a page template, that ensures that all pages generated based thereon may include some elements, such as menus, footer elements, background elements, or the like. In such a system, the generated pages may comprise copies of the same element. However, the same element may be programmatically distinct in each page. For example, the element may be an element in an HTML page. The same element may appear in two different pages. However, a change in one page would not affect the other page. This is as opposed to a change in the base code that generates the pages, which would uniformly affect all generated pages from that point in time onwards. In some exemplary embodiments, shallow copies created based on served pages may be created based on a capture of the HTML itself, without capturing any shared code between pages (e.g., without capturing any backend or frontend code that is used to generate the HTML). It may be desired to update the demonstration by updating the same element in different pages in a uniform manner.

One technical solution provided by the disclosed subject matter is to define an aggregated object in a multi-page demo. The multi-page demo may comprise be a set of shallow copies of pages from a web-based system, which may be copied to create a demonstration. In some cases, the web-based system may comprise a frontend and a backend. The backend may be configured to provide linked documents to be presented by a client device executing the frontend. The linked documents may comprise links, such as Uniform Resource Identifiers (URIs), links to other (potentially, linked) documents, or the like. The frontend may be configured to request documents from the backend and present them to the user. As an example, the linked documents may be HTML files, the frontend may comprise a browser and a set of webpages, constituting a website, and the backend may comprise a web server. The browser and web server may interact using the HyperText Transfer Protocol (HTTP). In some exemplary embodiments, the pages presented by the web-based system may be copied and shallow copies thereof, which do not link to the backend, may be created. The shallow copies may be linked to one another, so as to allow navigation. e.g., using a browser, between one shallow copy to another. Such navigation may provide for a user experience (UX) that is substantially equivalent to that provided by the web-based system itself, but without affecting the data stored by the web-based system, without being subject to backend or frontend bugs the web-based system that affect the UI of the web-based system, without being affected by frontend modification done to the web-based system, or the like. In some exemplary embodiments, the multi-page demo may be predictable and consistent when executed.

In some exemplary embodiment, a web-crawler may be used to create shallow copies of pages provided by the web-based system, by traversing pages and executing the pages to render the display they define. Additionally, or alternatively, a user may navigate the web-based system and capture all or some of the traversed pages. In some exemplary embodiments, the shallow copies may be created by recording pages of the web-based system that are navigated to by an operator, recording page interactions in the pages, or the like. In some exemplary embodiments, a copy of a page of the product may be captured and added to a shallow copy of the product, e.g., using a capturing tool. For example, the software agent may store, in the shallow copy of the frontend, a copy of one or more pages of the web-based system. In some exemplary embodiments, the recording may be triggered by an operator, such as based on a command to record interactions of the operator (e.g., via a command line, a vocal command, a selection of a GUI element, or the like. For example, the recording may be paused and continued according to commands of the operator, indicating which portions of the session the operator wishes will be part of the demo that is being created.

In some exemplary embodiments, the recordation may be modified, with potential edits thereto, such as in order to anonymize the data in the recordation, to modify the demo to better suit a potential prospect, or the like.

In order to create a shallow copy of the frontend or portion thereof, linked documents of interest may be duplicated to create a copy thereof. In some cases, if a multi-page demo is desired, links between shallow-copies of linked documents may be added. The addition of links to the shallow copy may be performed automatically, such as by an automated process which explores the web-based system, creates a shallow copy of documents therein, and replaces links to other linked documents with links to shallow copies of the other linked documents. Additionally, or alternatively, the addition of the links may be performed manually, such as by an operator editing the demo.

After the multi-page demo, which comprises a set of shallow copies of webpages, is created, an aggregated object may be defined. The aggregated object may be linked to one or more of the shallow copies, and preferably to two or more. Once an edit operation is made with respect to the aggregated object, irrespective of on which page the edit is made, the edit may be reflected on all linked pages.

In some cases, the aggregated object may reflect the fact that when the original pages were generated, the element was created in a uniform manner in several pages. However, the pages themselves may not include any explicit indication of such connection. It is noted that in some cases, even the same element may appear different in different pages, such as due to obfuscation. For example, even if the object has an identifier tag in the HTML code, and such identifier is a unique identifier, if the web-based system is subject to obfuscation, the resulting served pages may include a different identifier in each serving of a page, and as a result, the unique identifier cannot be used to identify the fact that the same element appears in different pages.

In some exemplary embodiments, a demo editor may be utilized to edit a set of shallow copies of web-pages. An edit made to an aggregated object on one screen may be applied to all relevant screen in which the aggregated object exists. In some cases, any edit of an aggregated object may be stored as an aggregated object-specific update, such as instructions to edit links (e.g., between pages of the multi-page demo), perform style changes, modify the text, or the like. The updates may be implemented by a demo engine, such as configured to utilize JavaScript, CSS, or the like, to implement the updates in the displayed page. When the demo is played, each page may be updated by applying a page-specific update, in which updates regarding the elements in the page are applied, and by applying an aggregated object-specific update for each aggregated object appearing in the relevant page.

In some exemplary embodiment, the page-specific update created by the demo editor may include a copy of the object-specific updates if the aggregated object appears in the associated page. In such an embodiment, when the multi-page demo is played, the demo engine may be unaware of the logical association between different implementations of the same aggregated object in different pages, and instead apply the updates independently in each relevant page. Still, even in such an embodiment, the productivity of the operator when making demos is expected to be improved. Furthermore, the editor may require a reduced amount of memory resources to store the potential updates when the operator uses the demo editor, even if duplicative data is later on provided for each page (e.g., duplicating the object-specific updates for each relevant page).

Additionally, or alternatively, the object-specific updates may be retained independently from the page-specific updates, and may be applied on the relevant pages. In such an embodiment, on top of the improvement in productivity, there may be a reduction in required storage space, as de-duplication of update data may be achieved.

In some exemplary embodiments, the aggregated object-specific update may be applied on the aggregated object after such object is acquired in the page. In some cases, the aggregated object may be acquired using an acquisition method. In some cases, a plurality of acquisition processes may be utilized, such as to allow acquisition of the same object in different pages. As an example, acquisition may be performed using an XML Path Language (XPath) pointing to the aggregated object in the page. If the XPath acquisition fails, an alternative method, such as CSS selector, or the like, can be utilized. Put differently, a plurality of alternative acquisition methods may be utilized to identify the aggregated object. Once acquisition is successful using one method, the object is considered as acquired. In some cases, during the editing of the demo, an acquisition method is determined for a specific page. As an example, in a first page (e.g., 122 of FIG. 1A, see 100*a*), XPath may be utilized to acquire Aggregated Object 149, whereas in a second page (e.g., 124 of FIG. 1A, see 100*g* of FIG. 1G) a CSS selector may be utilized to acquire aggregated Actions Object 150. It is noted that the same acquisition method may be persistently used for the same page. In some exemplary embodiments, the disclosed subject matter may attempt to use different methods in a deterministic order. In such a case, the same method will always be used for the same page, when the document is the same (e.g., if the page remains the change and was not modified by manual HTML edits performed). In some exemplary embodiments, the operator may manually assist in pointing to the aggregated object in a specific page. Once such operation is performed, an acquisition method that performs well on the page such that it acquires the selected element (and only the selected element) may be selected and utilized for that page.

In some exemplary embodiments, one or more acquisition techniques may be utilized, such as XPath, CSS selector, or the like. XPath may be a language that is used to navigate through the elements and attributes in an HTML or an XML document. In some exemplary embodiments, XPath may enable selection of elements based on their tag name, attributes, position in the document hierarchy, or the like. XPath provides a number of functions that can be used to filter the selected elements. In some exemplary embodiments, XPath can be used to select elements in an HTML document. In some exemplary embodiments, XPath can select elements, with elements and attributes separated by slashes (/), with specific attributes denoted using the @ symbol (e.g., /bookstore/book[@year>2010]). Additionally, or alternatively, CSS may provide a number of ways to select elements, including element, class, and ID selectors, as well as attribute selectors and pseudo-class selectors. Additionally, or alternatively, CSS Selectors may be utilized. In some cases, elements in an HTML document may be selected based on tag name, class name, id, query selectors (e.g., using querySelector and querySelectorAll methods elements may be selected using text-defined selectors; for example, doc.querySelectorAll('a[target="_blank"]'), doc.querySelector('a[target="_blank"]');). In some exemplary embodiments, A CSS specific selector is generated for an element based on the structure of the page. Using the CSS selector, the object may be selected and actions may be performed thereon, such as modifying links, texts, styles, or the like.

In some exemplary embodiments, a visual display may be provided to an operator that is editing the multi-page demo. The operator may select a page to be displayed. Each object in the page that corresponds to an aggregated object may be displayed in an indicative visual manner. Additionally, or alternatively, a list of aggregated objects of the multi-page demo may be displayed, and a visual indication may be provided to which of the presented aggregated objects in the list is active in the page and which is inactive. Additionally, or alternatively, the operator may edit the list of pages in which the aggregated object is active. A list of all screens may be displayed and for each screen an indication may be displayed, such as using a toggle widget, indicating whether the aggregated object is active in the screen.

In some exemplary embodiments, the operator may decide to activate the aggregated object in a screen. In some exemplary embodiments, the aggregated object may be acquired automatically, such as using one of the acquisition methods that are used in the other screen. In some exemplary embodiments, the aggregated object may be automatically applied for every qualifying screen. In some cases, the user may accept or reject the automated selection. Furthermore, the user may manually unapply the aggregated object in a screen. In some cases, the user may manually select the element, and an acquisition method may be generated based on the selection. The new acquisition method may be considered page-specific and may be applied only for the selected page. In some cases, the new acquisition method may be utilized in other screens, if other available acquisition methods fail to acquire the aggregated object.

Based on edits performed by the operator in the multi-page editor to the aggregated object, in any of the screens, a modification object may be created. The modification object may represent the edits to be performed and may be applied when the demo is executed. For example, the modification object may be a description of an edit to be performed so as to modify the aggregated object, such as by modifying text labels, colors, images, or the like. In some exemplary embodiments, the modification object may be instructions to be implemented by a client-side code, such as Javascript, to edit the HTML page. Additionally, or alternatively, the modification object may be a client-side code to be executed to cause the edits to be performed. In some exemplary embodiments, a single modification object may be created and re-used for all screens in which the aggregated object appears. The single modification object may be created based on multiple edits in different pages. By using a single modification object, the memory resources required to retain the multi-page demo may be reduced. Additionally, or alternatively, the modification instructions regarding the aggregated object may be duplicated into modification objects of the relevant pages, such as the pages in which the aggregated object appears.

In some exemplary embodiments, page specific edits to the aggregated object may be performed. In some cases, the operator may indicate that specific edits should be implemented in a specific page only. For example, the aggregated object may be a menu. The operator may decide to use a different highlighting indication of the selected item in the menu. In different screens, different items are selected. Hence, the operator may decide that the modification of the highlighting manner of the selected item in one screen be applied only in such screen. In some exemplary embodiments, a page-specific modification object may be created. In some cases, during execution of the multi-page demo, the modification of the aggregated object that are defined in the single modification object may be implemented, followed by implementation of the modifications of the aggregated object defined in the page-specific modification object that is associated with the displayed screen, if such page-specific modification object exists.

One technical effect of utilizing the disclosed subject matter may be objectively improving the user experience of the operator when editing a multi-page demo. In some exemplary embodiments, the disclosed subject matter may enable the customization of the multi-page demo to be performed quicker, using less processing resources (e.g., as less user commands are required), using less memory resources (e.g., as a reduced amount of information is retained), and using less communication resources (e.g., as the operator need not traverse each screen, retrieve it from a repository, in order to indicate that the same edits are to be performed thereon; e.g., as the modification objects are compressed by retaining single copy of potentially duplicative data, as is done in the naïve solution in which aggregated objects are not available).

In some exemplary embodiments, the demo may be executable in an offline manner, in a system having no network connectivity, enabling the demo to be displayed to government agencies and other entities having restrictive network guidelines. It is noted that in some cases, the web-based system itself may be deployed in an on-premise ("on-prem") configuration, without requiring Internet access. However, before the client wishes to deploy the system, the client may wish to view a demo. At such point in time, the system may not yet be deployed in the on-prem configuration. The disclosed subject matter enables demonstrating the functionality of the system while adhering to restrictive Internet access guidelines, and prior to the deployment of the on-prem configuration. In some exemplary embodiments, the disclosed subject matter may enable to generate a demo that is operable in a standalone environment and without relying on access to any remote resource.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIGS. 1A-1J illustrating screenshots of systems in accordance with some exemplary embodiments of the disclosed subject matter.

Screenshot 100a shows an editing screen used by a human operator to edit a multi-page demo. In some exemplary embodiments, the multi-page demo is created based on manual or automatic traversal of the web-based system being demoed and creating shallow-copies of the pages that are presented to the user by the web-based system. A shallow copy of a traversed page is created by copying the traversed page and removing therefrom the option of traversing to other pages or invoking backend functionalities. In some cases, all traversable URLs may be removed. Additionally, or alternatively, URLs pointing to other pages, for which shallow copies were created, may be modified to point to the shallow copy instead of the page in the web-based system, thereby enabling traversing pages within the multi-page demo, while providing the UX of the web-based system.

Menu 102 enables the operator to access help resources, configure the multi-page demo, share the demo, save updates to the demo, preview the demo, and publish the demo. Menu 102 also displays the name of the page currently being edited, also referred to as the active page (in this case "1.1 Home"). A Screens Pane 120 shows all pages of the multi-page demo. Clickable thumbnails 122, 124, 126 can be used to select an active page. Thumbnail 122 is highlighted, indicating that the active page is the page "1.1 Home" shown in Thumbnail 122.

Canvas 110 shows the active page. As is illustrated in FIG. 1A, the active page is the page of Thumbnail 122. In this example, the active page is a page from the ASANA™ web-based system. Elements of the page may be edited by the operator. For example, the operator may edit the text (e.g., change "Sunday, November 6" to "Monday, November 7", or "Just another day"), change the font, color, size, background, border or any other style feature of an element. In some cases, the operator may replace an image shown in the active page by another image. Additionally, or alternatively, the operator may remove an element, delete an element, add a new element, or the like. Additionally, or alternatively, the operator may edit links in the active page to create a traversable link to other pages of the multi-page demo.

Actions Object 150, shown with an encompassing dashed rectangle, is an element that appears in several pages. The element includes a search widget, an add new (+) widget, an upgrade widget, and an avatar widget. The operator may wish to edit Actions Object 150 and have such edits be reflected on all relevant pages in which Actions Object 150 appears.

In some exemplary embodiments, the operator may utilize the multi-page demo editor as a What You See Is What You Get (WYSISYG) editor.

It is noted that the dashing shown in FIG. 1A are shown for clarity of explanation and may be omitted and not shown the operator using the multi-page demo editor.

In Screenshot 100b, the operator has selected, e.g., using a pointing device, Actions Object 150. The editor may display an Editing Widget 152, enabling the operator to edit Actions Object 150, which is now highlighted in a visual manner in the editor. As can be appreciated, Editing Widget 152 enables editing content, editing links, adding or updating tool tips, or the like. A Smart Object Widget 154 is also shown, enabling the operator to define a smart object (also referred to as an aggregated object).

Figure 1D:
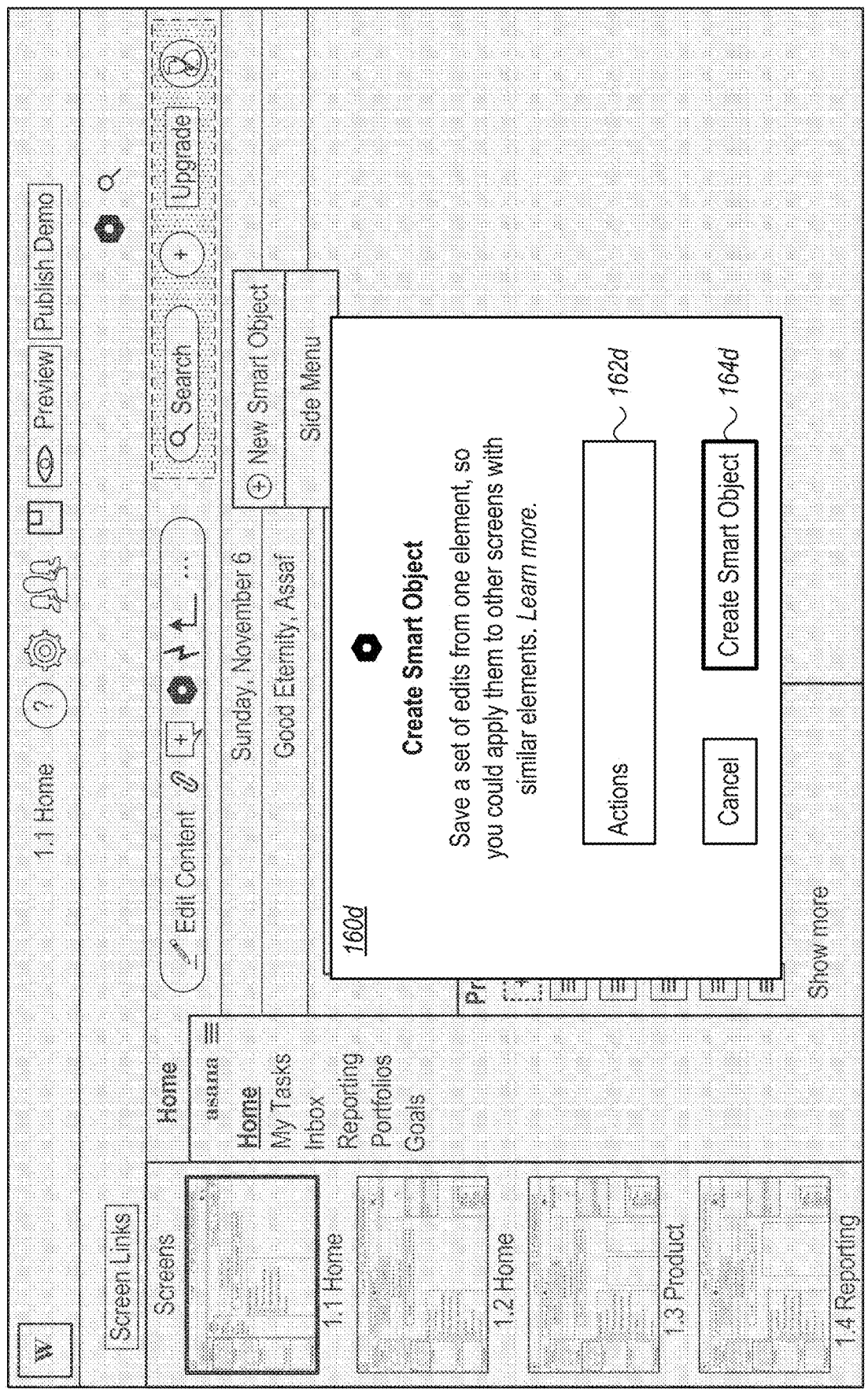
Figure 1E:
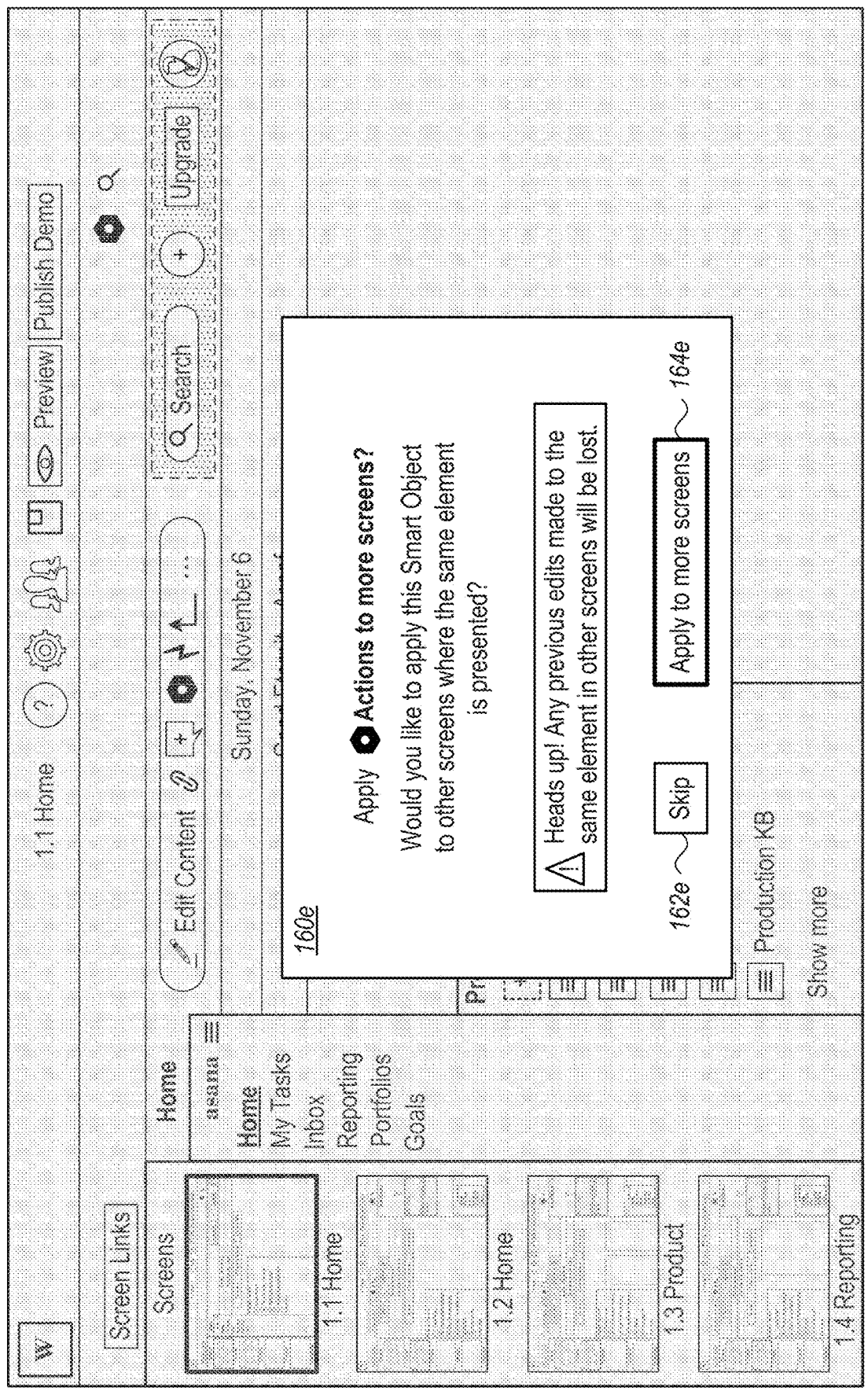

After the operator clicks on the Smart Object Widget 154, the operator is than prompted, e.g., using Widget 156, to select between associating Actions Object 150 with an existing smart object (e.g., "Side Menu") or create a new smart object. In some cases, the smart object may have already been defined, such as with respect to other pages, and has not been associated with Actions Object 150 in the active page. This may be due to automated acquisition not being able to identify Actions Object 150 in the active page. Additionally, or alternatively, this may be due to manual application of smart objects on pages. Assuming the operator wishes to create a new smart object (e.g., the existing smart object related to a different element), Pane 160*d* may be displayed (FIG. 1D). The operator may define a name for the new smart object in Name Field 162*d*, and confirm to create the smart object (164*d*). Pane 160*e* (FIG. 1E) allows the operator to select between automated identification of the smart object in other pages (164*e*) or skipping the automated process (162*e*). If automated application is selected (164*e*), each page of the multi-page demo may be processed and the smart object may be attempted to be acquired. If acquisition is successful, the acquired element is automatically associated with the newly created smart object. In some exemplary embodiments, previous edits made to the same element may be dropped. In other embodiments, previous edits may be preserved completely or partially. As an example, previous edits that contradict edits in the smart object may be dropped, while edits that do not create a contradiction may be preserved. For example, edits to the font of a text element that contradicts another font edit may be dropped. However, edits to the color of an element whose color is not edited with respect to the smart object may be preserved. Other rules may be applied to select which edits are preserved and which are dropped.

Figure 1F:
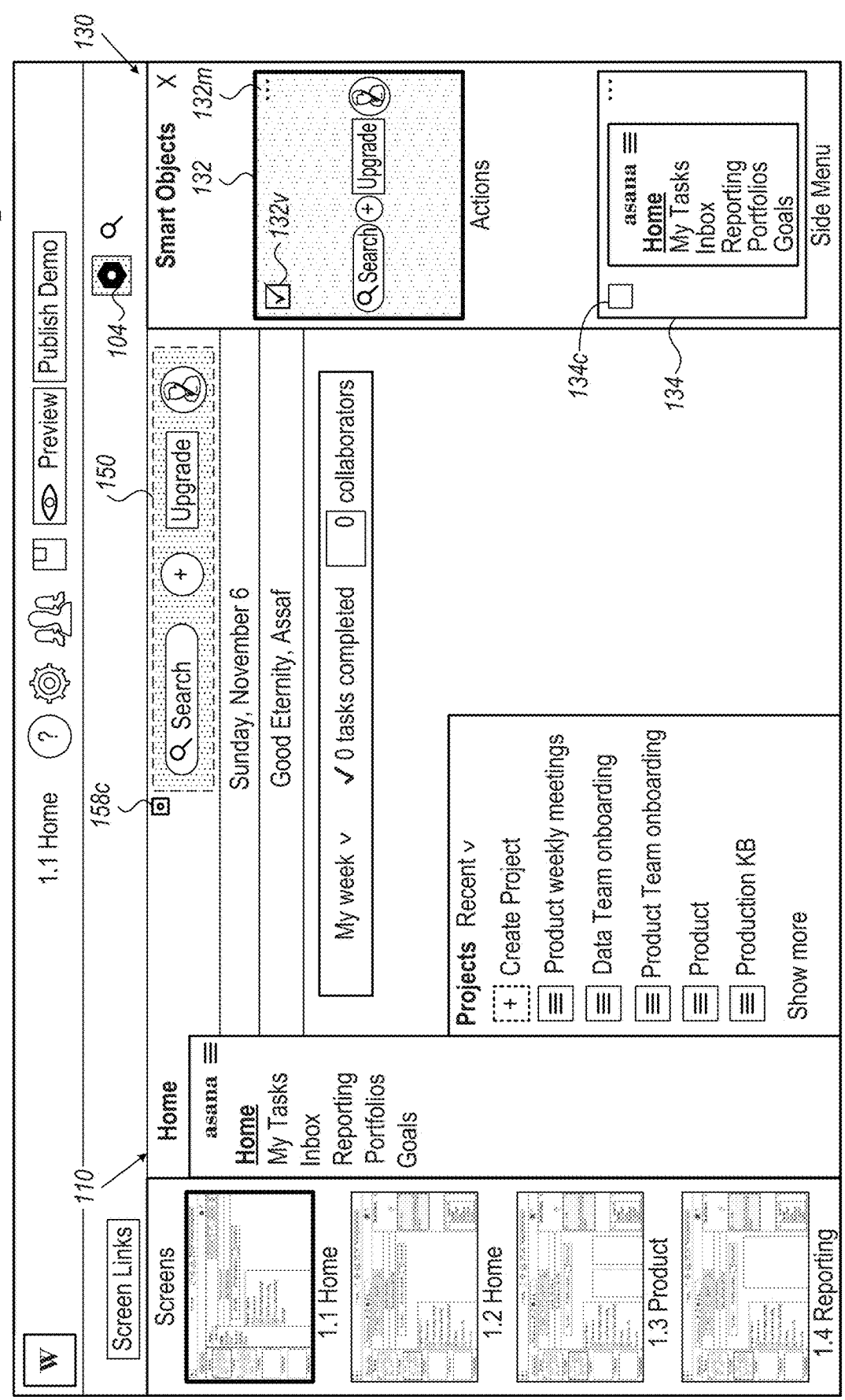

Screenshot 100*f* of FIG. 1F provides a display of the Smart Objects Pane 130. The operator may toggle the display of Smart Objects Pane 130 using Widget 104. As Widget 104 is selected, Smart Objects Pane 130 is now shown.

Smart Objects Pane 130 shows the smart objects that are defined in the multi-page demo. As is illustrated, there are two smart objects—Actions Smart Object 132, and Side Menu Smart Object 134. Each object may be presented in a thumbnail providing a rendering of the smart object itself. For example, Actions Object 150 may be identified in the DOM of the page. The HTML code of Actions Object 150 may be extracted and used for rendering of the thumbnail of Actions Smart Object 132.

For each smart object there is an indication of whether the smart object is enabled in the active page. Checked Checkbox 132*v* indicates to the operator that Actions Smart Object 132 is enabled in the active page, while unchecked Checkbox 132*c* indicates to the operator that Side Menu Smart Object 134 is disabled in the active page. The operator may untick Checkbox 132*v* to update the active page to be disconnected from Actions Smart Object 132. Additionally, or alternatively, the operator may tick Checkbox 134*c* to update the active page to connect to the Side Menu Smart Object 134. In some cases, the side menu object may be acquired automatically in the active page. In some cases, the operator may verify an automated selection (e.g., semi-automatic acquisition). In some cases, the operator may manually select the element in the active page for association with the enabled smart object.

In some exemplary embodiments, in case Actions Object 150 is selected in the active page, the corresponding smart object in Smart Objects Pane 130 may be highlighted and indicated as selected.

The operator may also see that Object 150 is a smart object based on the visual display thereof (e.g., using a dedicated background). Additionally, or alternatively, Marker 158*c* may indicate that the object near it is a smart object. It is noted that in some embodiments, Marker 158*c* may be clickable, and when clicked, information regarding Actions Object 150 may be displayed, such as Actions Smart Object 132, additional information (e.g., accessible via the Three-Dot Icon 132*m*), or the like.

Figure 1G:
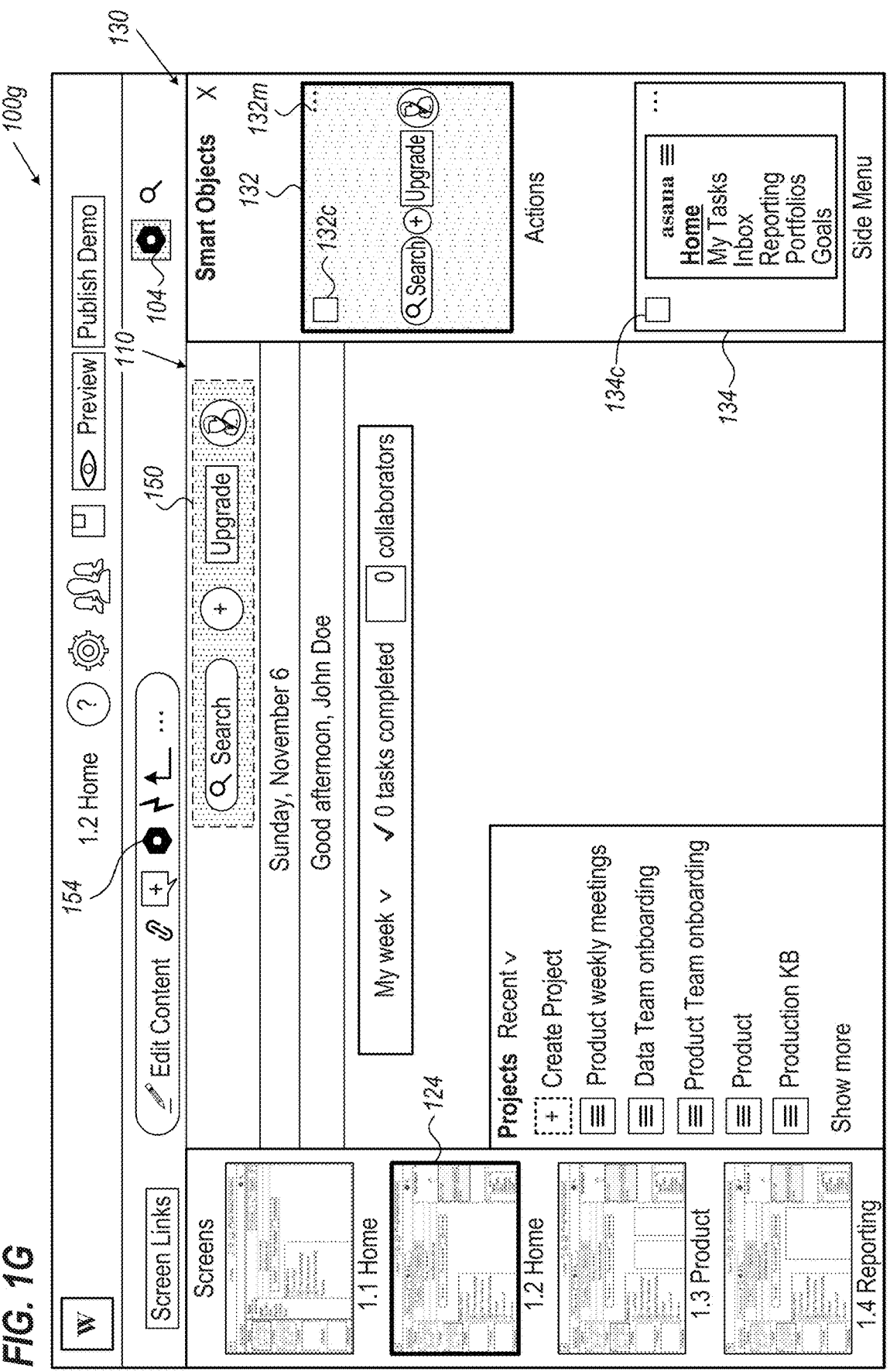
Figure 1H:
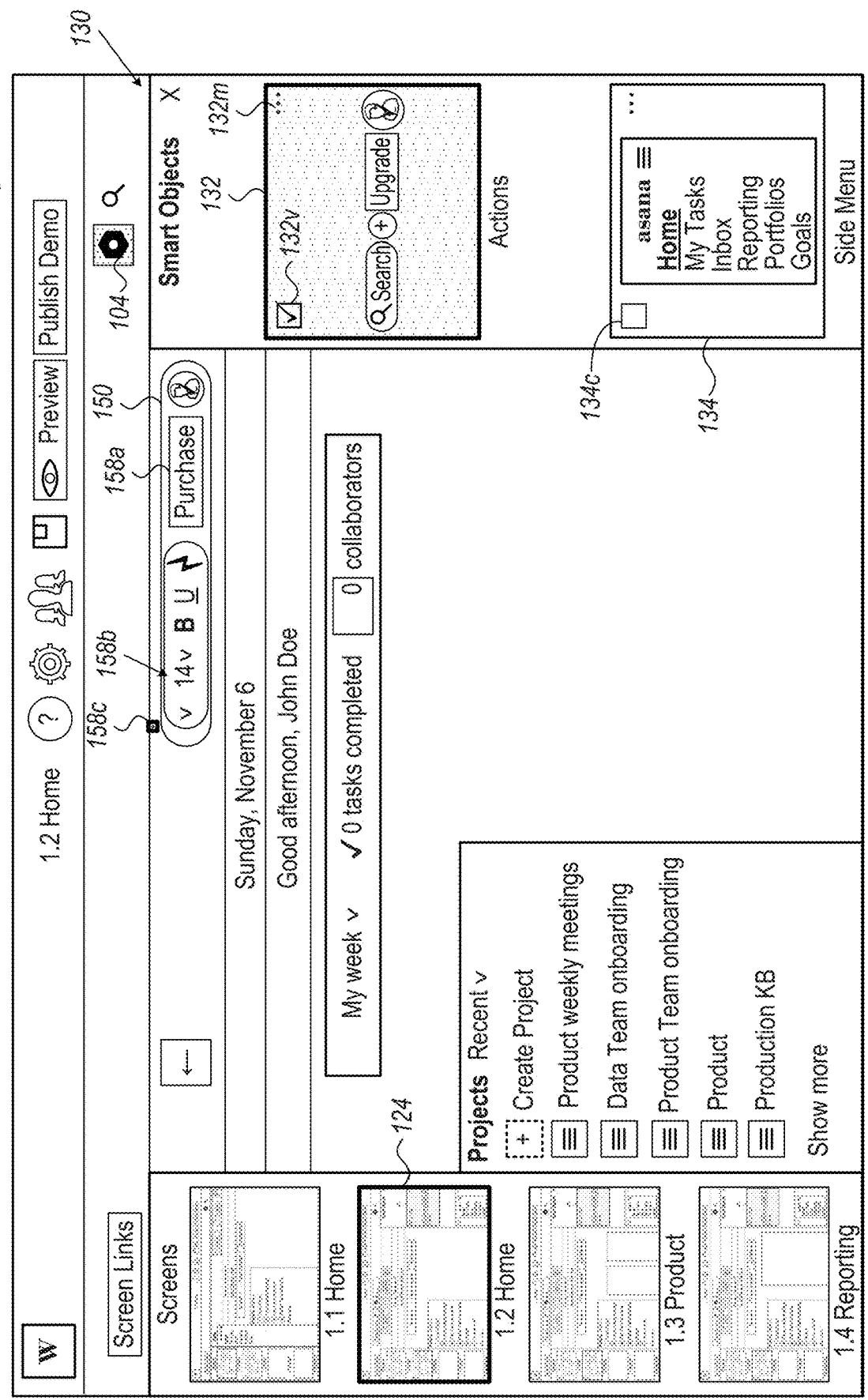

Screenshot 100*g* of FIG. 1G shows a different active page. Screens Pane 120 shows Thumbnail 124 of the page named "1.2 Home" as selected. Canvas 110 shows a different page than was shown in FIGS. 1A-1F. For example, in the new active page, there is no Side Menu. As can be seen, the operator may select Object 150 in the active page and associate such object with Actions Smart Object 132. For example, the operator may click Smart Object widget 154 to start the process of selecting a smart object to be associated with Object 150 shown in the new active page (e.g., based on a selection of an existing smart object, or by creating a new smart object). Additionally, or alternatively, the operator may tick an unchecked checkbox, such as 132*c*, 134*c*, to select and associate a smart object with Object 150.

After Object 150 is associated with Actions Smart Object 132, and as is illustrated in Screenshot 100*h*, the operator may edit the object appearing in the active page. In this example, Button 158*a* is being updated to have a textual label of "Purchase" instead of "Upgrade". Additional editing may be performed using Overlay Widget 158*b*, such as updating font size, bold, underline, or the like. Overlay Widget 158*b* may be shown during the time the operator is editing Button 158*a*.

Figure 1I:
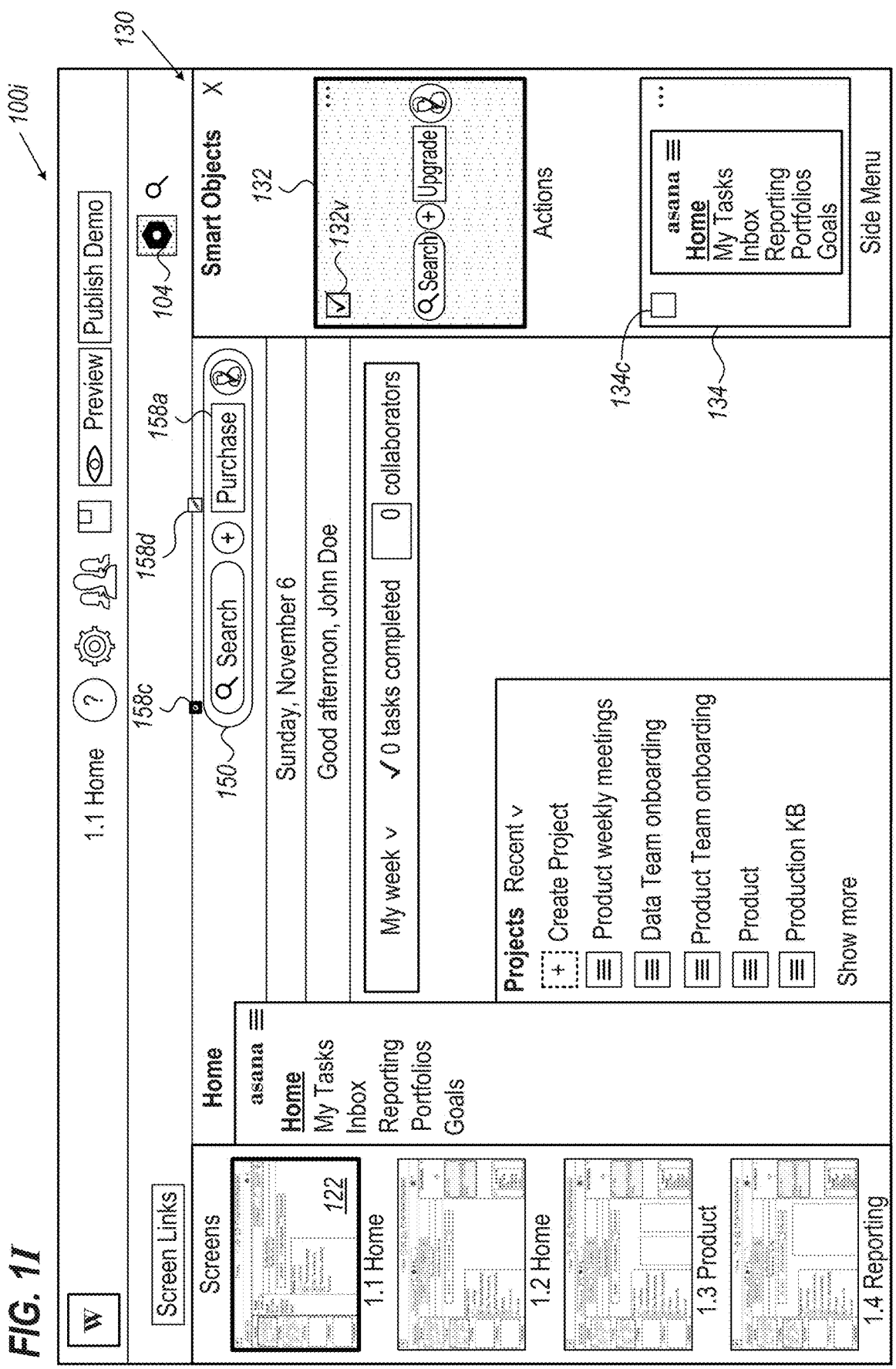

FIG. 1I, shows Screenshot 100*i*, after the operator traversed back to "1.1 Home" screen (e.g., using Thumbnail 122). Object 150 shown now reflects the editing performed on Object 150 in Screenshot 100*h*. Marker 158*d*, associated with Button 158*a*, may indicate that such element has undergone an editing operation.

The operator may access additional information regarding Actions Smart Object 132, such as using Three-Dot Icon 132*m*. In one embodiment, as is shown in Screenshot 100*j* of FIG. 1J, Actions Pane 140 may show information regarding the "Actions" smart object (142). For example, each screen of the multi-page demo may be shown in a thumbnail. Such as Thumbnail 146, and for each such page, there may be a toggle (146*b*) for enabling or disabling the smart object in the specific screen. For example, Thumbnails 146, 148 indicate through their respective Toggles 146*b*, 148*b*, that the smart object is enabled therein, while Thumbnail 149, through its respective Toggle 149*b*, indicates that in the page represented by Thumbnail 149, the "Actions" smart object is disabled.

Figure 2:
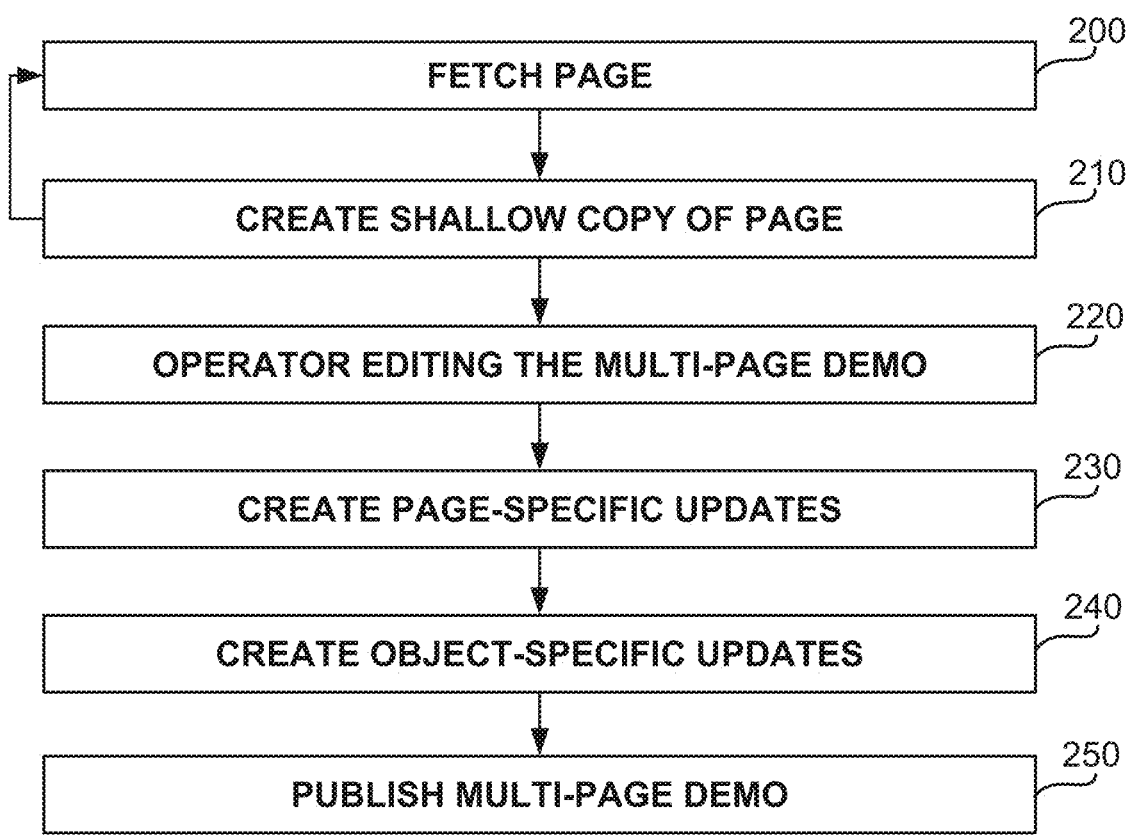
FIG. 2 shows an exemplary flowchart diagram of a method, in accordance with some exemplary embodiments of the disclosed subject matter.

Referring now to FIG. 2 illustrating a flowchart diagram of a method, in accordance with some exemplary embodiments of the disclosed subject matter.

On Step 200, a page may be fetched. The page may be part of a frontend of the web-based system. In some exemplary embodiments, the page may be an HTML page, an eXtended Markup Language (XML) file, a page of a mobile app, or the like. In some cases, a browser may be utilized to obtain a page from a remote server and display the page to an operator as part of the functionality of the web-based system. The page may be fetched, for example, using a browser extension. The operator may invoke a fetching operation to a specific page in a manual manner. Additionally, or alternatively, semi-automatic fetching may be implemented, such as by recording all pages the operator browses. Additionally, or alternatively, automatic fetching may be performed using a web crawler that automatically traverses all or some of the pages of the web-based system.

In some exemplary embodiments, the page may serve as part of the frontend of the web-based system. The page may be, for example, a webpage that is transmitted by the backend, such as using HyperText Transfer Protocol (HTTP). The frontend may rely on a browser or similar application to render the page and display the content thereof to the user. Links in the page may enable the user to navigate from one document to another. In some exemplary embodiments, the frontend may be based on a set of webpages that constitute, together, a site, that is accessible using a browser having connectivity (e.g., via a computer network, via the Internet, or the like).

In some exemplary embodiments, fetching of the page may be implemented without the use of a browser extension. As one example, a desktop agent may be executed in parallel to the frontend (e.g., browser, headless browser, in-app browser, native application, or the like). The desktop agent may be configured to monitor activity of the frontend and obtain relevant information therefrom. As another example, fetching may be implemented by using a dedicated fetching website. In some exemplary embodiments, the fetching website may be configured to present the target web-based system and to monitor interactions therewith, requests and responses associated therewith, or the like. In some exemplary embodiments, the fetching website may present the target web-based system in an inline frame (iframe) element. Through the use of an API of the iframe element, the fetching website may monitor retrieved pages, user interactions, requests and responses, or the like, associated with the target web-based system, thereby enabling the user to fetch specific portions of the target web-based system. As yet another example, the fetching may be performed using an automated bot, configured to mimic user interaction with the target web-based system in an automated manner.

On Step 210, a shallow copy of the page may be created. The shallow copy may be a copy of the page. The page may comprise links, such as URIs, URLs, or the like. Additionally, or alternatively, the page may comprise links to other resources, such as additional documents, additional pages, or the like. In some exemplary embodiments, one or more links may be removed from the shallow copy. In some exemplary embodiments, URLs that are included in hyperlinks, enabling a user to navigate to a different page may be identified and removed. For example, any href property in an HTML tag, such as but not limited to "a" tag, "area" tag, or the like, may be removed to create the shallow copy.

In some cases, rendering the page for presentation may rely on external resources, such as digital images, style sheet files, or the like. Creation of the shallow copy may include creating a copy of all such required resources and link to the copied resources instead of the originally linked resources.

In some cases, Steps 200-210 may be performed a plurality of times, until all relevant pages of the multi-page demo are processed and shallow copies thereof are created.

On Step 220, the operator may edit the multi-page demo via an editor interface. The operator may define one or more aggregated objects that are implemented in several pages. In some cases, the operator may instruct to edit a page in an object that is not related to an aggregated object, inferring a page-specific update. Additionally, or alternatively, an edit instruction performed with respect to an aggregated object may be reflected in all pages in which the aggregated object appears. In some exemplary embodiments, the operator may link the shallow copy pages one to the other, thereby creating a potential flow between pre-existing pages of the multi-page demo.

On Step 230, one or more page-specific updates may be created for a page based on the edits instructed by the operator.

On Step 240, an object-specific updates may be created for the multi-page demo based on edits of aggregated objects.

On Step 250, the multi-page demo may be published and made accessible for an end-user to experience. The demo may be published by making the demo accessible to be utilized by others. In some cases, the demo may be published by uploading the shallow copies to a server, enabling remote access thereto. Additionally, or alternatively, the demo may be published by downloading the shallow copies to a storage device, enabling execution of the demo from the storage device. It is noted that the demo retained in the storage device may be operable in a standalone environment and without relying on access to any remote resource.

Figure 3:
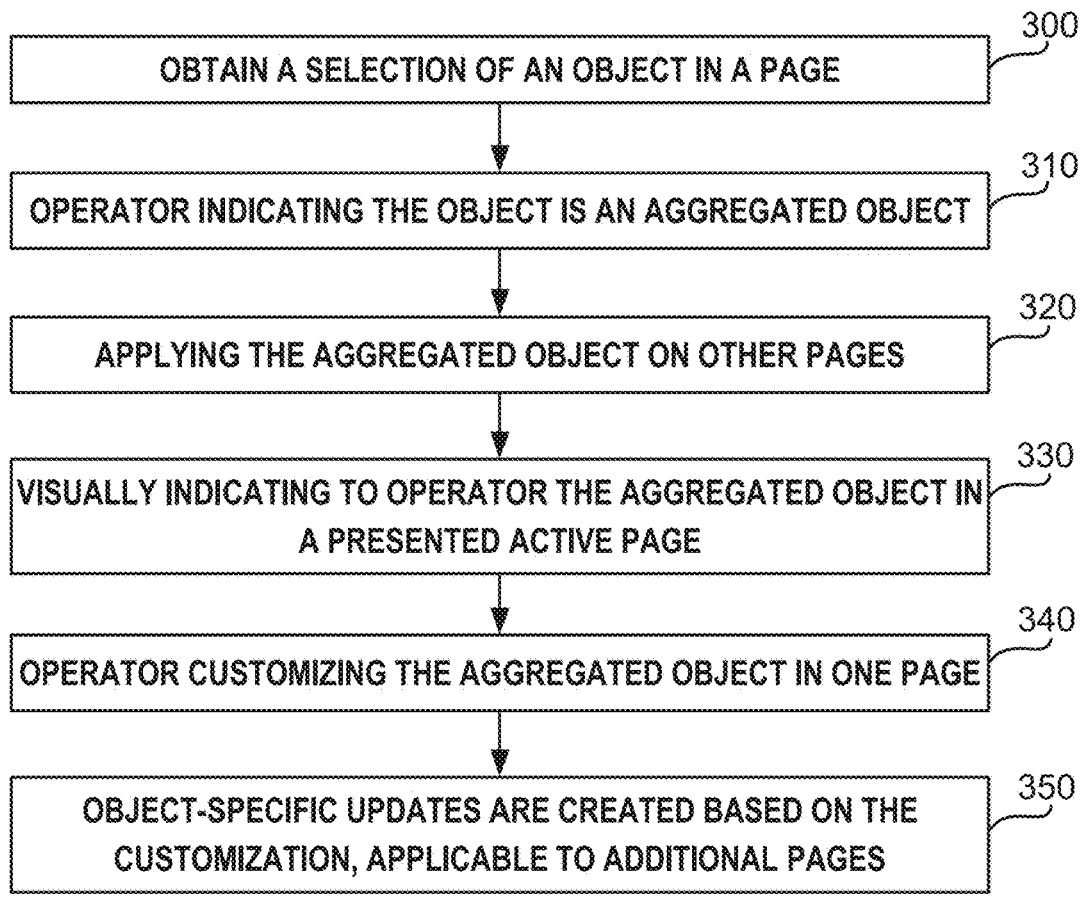
FIG. 3 shows an exemplary flowchart diagram of a method, in accordance with some exemplary embodiments of the disclosed subject matter.

Referring now to FIG. 3 illustrating a flowchart diagram of a method, in accordance with some exemplary embodiments of the disclosed subject matter.

On Step 300, an object in the page may be selected. In some exemplary embodiments, the page may be an HTML page, a web page, an XML page, a linked document renderable and presentable by a browsing application, or the like. In some exemplary embodiments, an operator may utilize an editor, such as exemplified in FIGS. 1A-1J, to manually select the object in the page. The selection may be performed using a pointing device, such as a mouse, a touch screen, or the like. Based on the selection, a selector may be defined, enabling to automatically select the same object in the same page again in an automated manner, such as an XPath expression representing the selected object within the page, a CSS selector for selecting the object in the page, or the like.

Additionally, or alternatively, the selection may be performed automatically, such as using an automated selector. In some exemplary embodiments, automated acquisition of the object may be performed, such as using a CSS selector, XPath, or the like. In some cases. A pre-existing aggregated object may have one or more acquisition methods, that are operable on other pages. The acquisition methods may be utilized to automatically select the object in the page. In some cases, the selection may be semi-automatic and the operator may confirm or reject the automated selection.

On Step 310, the operator may indicate that the object is an aggregated object. For example, the operator may interact with a smart object widget (154) to indicate that the object is the aggregated object. In some exemplary embodiments, the operator may associate the object to a pre-existing aggregated object (e.g., using Widget 156 in FIG. 1C; using Smart Objects Pane 130 of FIG. 1F; or the like). Additionally. or alternatively, the operator may define a new aggregated object (e.g., using Widget 156 of FIG. 1C; using Pane 160*d* of FIG. 1D, or the like).

In some exemplary embodiments, the operator may first select a pre-existing aggregated object, e.g., from a pane or other widget displaying existing aggregated objects, and may thereafter associate the aggregated object with the object in the page. For example, the operator may first select Actions Smart Object 132 of FIG. 1F, indicate that such aggregated object is represented in the active page (e.g., by ticking the respective checkbox, such as 132v, 134c), and thereafter select the object in the page.

In some exemplary embodiments, based on the selection of the object and the indication of the object being an aggregated object, an association between the object and the aggregated object may be performed.

On Step 320, the aggregated object may be applied automatically on other pages. For example, in cases where the aggregated object is created (e.g., FIGS 1D-1E), the new aggregated object may be applied on other pages, on all pages of the multi-page demo, on all pages of the multi-page demo that are of a certain type, on all pages of the multi-page demo that are selected by the operator, or the like. In some cases, if the aggregated object is acquired automatically on a page, the acquired object may be indicated to be the aggregated object and an association between the two may be created. In some exemplary embodiments, the operator may or may not confirm the automated selection. In some exemplary embodiments, if acquisition is unsuccessful, no association in a specific page may be performed. Additionally, or alternatively, the operator may manually select the appropriate object in such specific page.

On Step 330, visual indication may be provided to the operator indicating that a presented object in a page is the implementation of the aggregated object in the page. In some cases, the operator may utilize an editor as is exemplified in FIG. 1F. The aggregated object appearing within in the active page may be visually indicated to be an aggregated object using visual indications such as highlight, marker (158c), or the like. In some exemplary embodiments, the visual indication may be presented over the active page and as part thereof as is exemplified in FIG. 1F. In some exemplary embodiments, the visual indication may be implemented by utilizing the acquisition method of the aggregated object for the active page to acquire the relevant element of the active page, and to update the rendering of the page to provide the highlight. In some exemplary embodiments, the updating of the rendering may be performed using CSS, JavaScript code, or the like.

On Step 340, the operator may customize the aggregated object in one page. The customization may be customization of any property of the aggregated object, such as but not limited to a text label, a clickable link, a resource link, font type, font size, font color, highlight color, border size, border type, or the like.

On Step 350, based on the customization in one page, an object-specific update code may be created. The object-specific update code may be applicable to other pages in which the aggregated object is present. In some exemplary embodiments, the same code may be applicable on different pages to cause the different implementations of the aggregated object to be modified in accordance with the customization performed by the operator on Step 340.

In some exemplary embodiments, for each aggregated object there may be a separate object-specific update code. The code may be a script, a CSS, any other digital manner of instructing a browser to update the page. In some exemplary embodiments, the code may rely on automatic acquisition of the element that implements the aggregated object in the page (e.g., using any acquisition method, such as selectors, XPath, or the like), and after such acquisition, the code may be applicable to cause the acquired element (or sub-elements thereof) to be modified. Hence, the same code may be applicable even when different selectors or different acquisition methods are utilized on different pages.

In some exemplary embodiments, a page-specific update code may be similarly created to reflect other customizations that are page-specific, such as updates to non-aggregated objects. In some exemplary embodiments, the operator may define a subset of the customizations on the aggregated object to be reflected only in the active page, and therefore be included in the page-specific update and not in the object-specific update. For example, consider Side Menu Smart Object 134 shown in FIG. 1I. The operator may wish to update the side menu aggregated object only in the active page, in which the item "Home" is selected, to reflect a different form of highlighting. For example, instead of bold font and underline, the operator may decide to change the color of the text and its background. However, such a change should not be reflected on pages where the side menu appears but in which other items of the menu are selected (e.g., "My Tasks". "Inbox", etc.).

In some exemplary embodiments, instead of creating page-specific updates and object-specific updates, the shallow copy pages themselves may be updated and retained in their updated form. With each object-specific update, all pages of the multi-page demo in which the aggregated object exists, may be updated to reflect the change. With each page-specific update, the page may be updated accordingly. However, when such embodiment is used, reverting to the original form may be problematic and require a backup of the original page. Additionally, or alternatively, if the aggregated object is applied on a new page, it may not be clear which updates that were previously applied on the aggregated object should be applied on the new page, and there may not be a list of such updates.

In some exemplary embodiments, instead of retaining an aggregated-object updates that provide instructions how to modify an existing element in the page to the updated customized desired form (e.g., change font size to new size, replace text to new text, etc.), an HTML snippet representing the customized aggregated object may be retained (e.g., use a specifically defined element as is). The snippet may be used to replace the aggregated object in a page, after the aggregated object is identified in the page using the acquisition method. It is noted that such a snippet and the instructions to replace the aggregated object with the customized object retained in the snippet, may be considered as an aggregated-object update as well. It is noted that the snippet may be utilized to create a thumbnail such as shown on Smart Objects Pane 130 of FIG. 1F.

Figure 4:
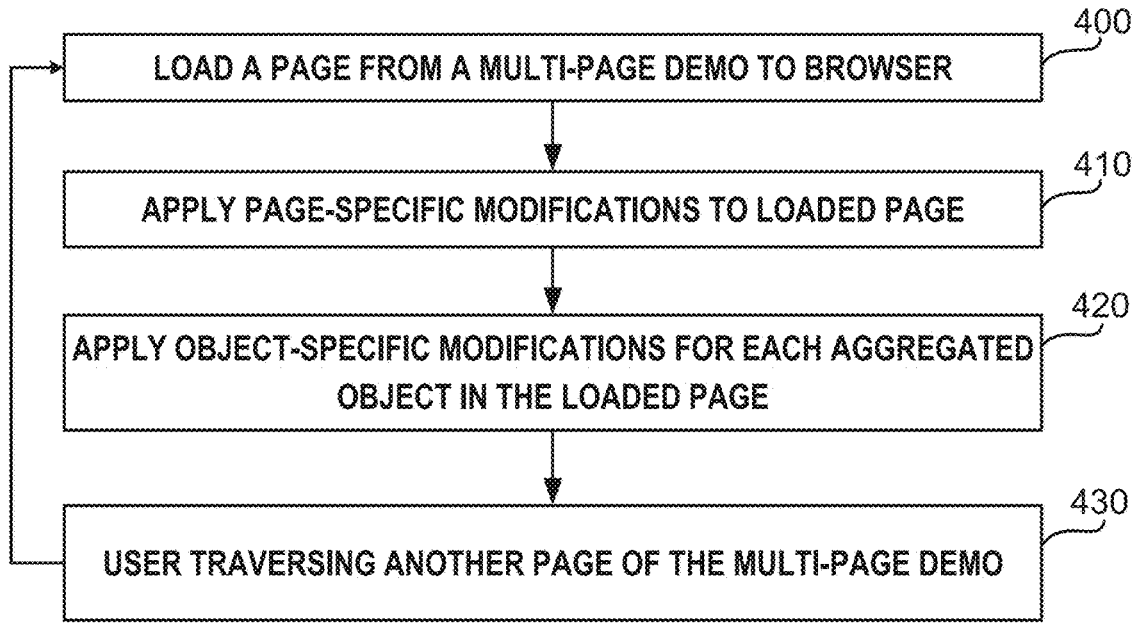
FIG. 4 shows an exemplary flowchart diagram of a method, in accordance with some exemplary embodiments of the disclosed subject matter.

Referring now to FIG. 4 illustrating a flowchart diagram of a method, in accordance with some exemplary embodiments of the disclosed subject matter.

On Step 400, a page from a multi-page demo is loaded to the browser to be rendered thereby. The page may be a shallow copy of a page of a web-based system. The multi-page demo may be a published demo such as published on Step 250.

On Step 410, one or more page-specific modifications may be applied to the loaded page to customize the page per the operator's instructions. In some exemplary embodiments, the page-specific modifications may be retrieved via a linked resource in the page. In some exemplary embodiments, client-side code may be implemented in the page causing the browser to retrieve page-specific modification instructions and to apply such modifications.

Figure 1J:
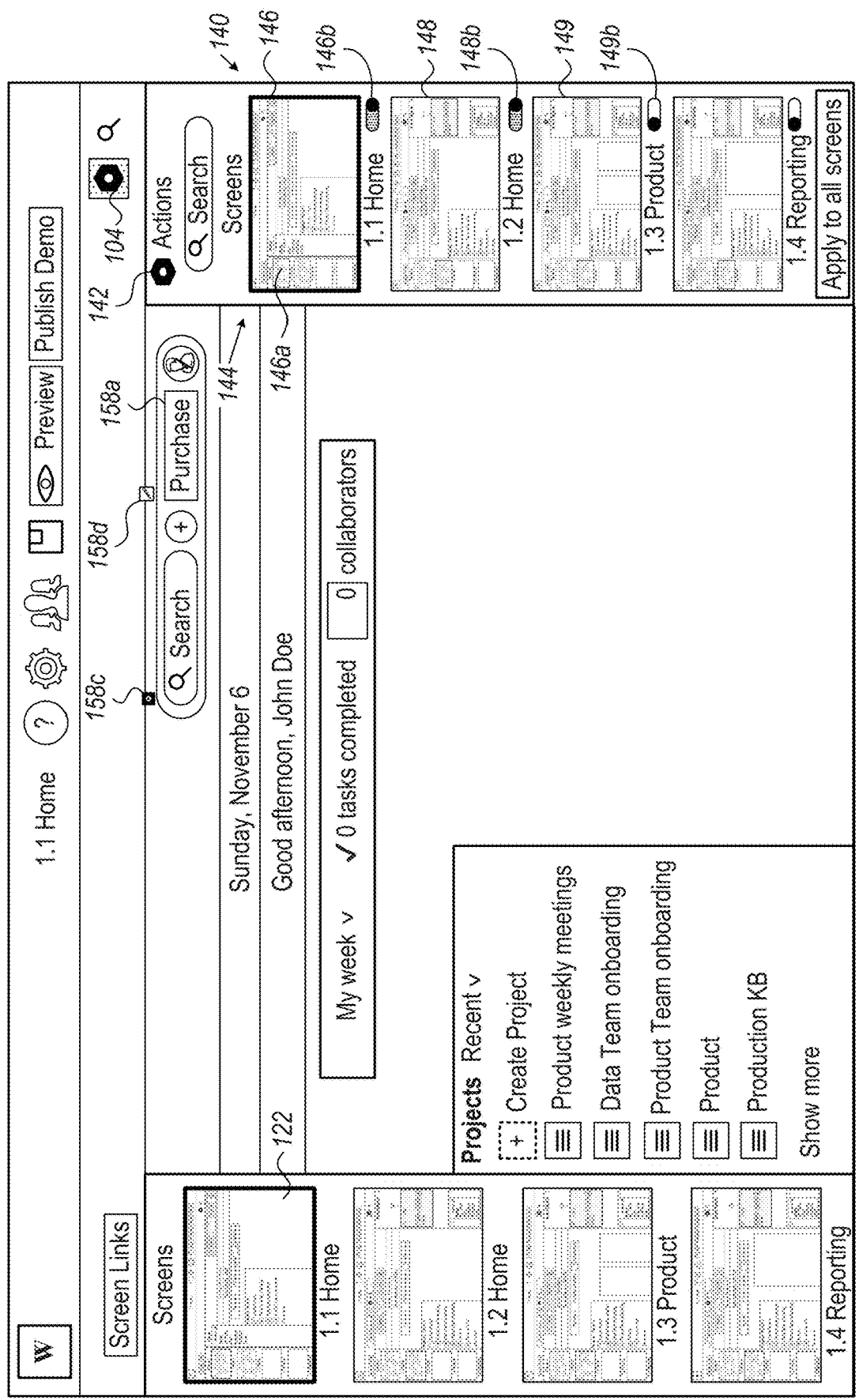

On Step 420, one or more object-specific modifications may be applied to the loaded page to customize the aggregated object per the operator's instructions. In some exemplary embodiments, the object-specific modifications may be retrieved via a linked resource in the page. In some exemplary embodiments, client-side code may be implemented in the page causing the browser to retrieve object-specific modification instructions and to apply such modifications. In some exemplary embodiments, the page may be modified to cause the browser to implement the object-specific modification instructions only with respect to aggregated objects that are linked to the specific page (e.g., Pane 140 in FIG. 1J shows that pages represented by thumbnails 146, 148 are linked with the aggregated object, whereas the page represented by thumbnail 149 is not).

It is noted that in some cases, object-specific modifications may be implemented before page-specific modifications, or vice versa. In some cases, the operator may define an order of application of the modifications. In some cases, the object is modified by iterative modifications instructions (e.g., instead of by a single update instruction that replaces it with a snippet), both page-specific modifications and object-specific modifications may modify the same object.

Figure 5:
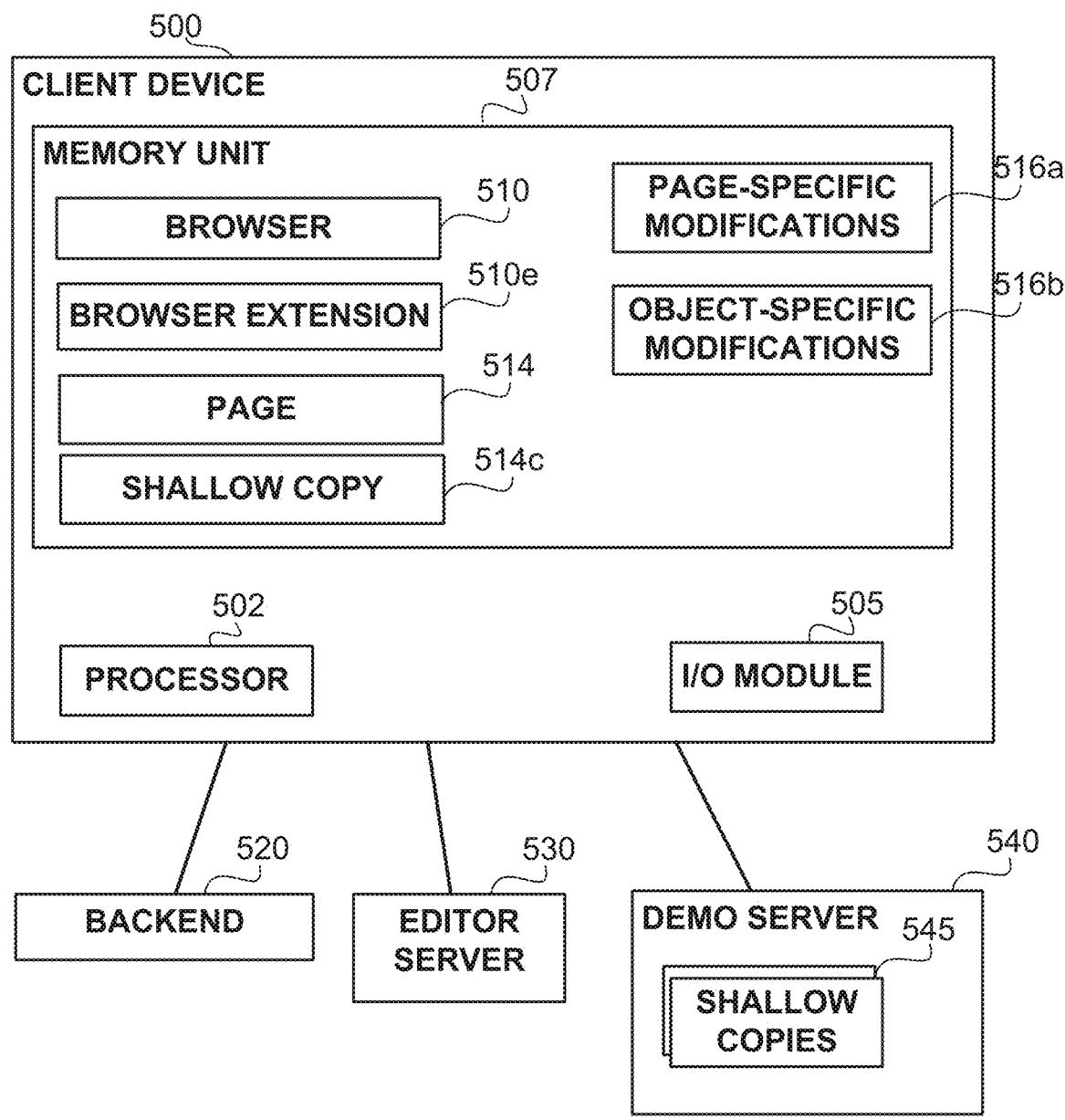
FIG. 5 shows an exemplary flowchart diagram of a method, in accordance with some exemplary embodiments of the disclosed subject matter.

Referring now to FIG. 5 showing a block diagram of a system, in accordance with some exemplary embodiments of the disclosed subject matter.

In some exemplary embodiments, a Client Device 500 may comprise a Processor 502. Processor 502 may be a Central Processing Unit (CPU), a microprocessor, an electronic circuit, an Integrated Circuit (IC) or the like. Processor 502 may be utilized to perform computations required by Client Device 500 or any of its subcomponents.

In some exemplary embodiments of the disclosed subject matter, an Input/Output (I/O) Module 505 may be utilized to provide an output to and receive input from a user. I/O Module 505 may be used to transmit and receive information to and from the user or any other apparatus, e.g., a backend 520, editor server 530, demo server 540, Internet, or the like In some exemplary embodiments, Client device 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 302 to perform acts associated with any of the subcomponents of Client Device 500.

In some exemplary embodiments, Browser 510 may be configured to retrieve Page 514 from Backend 520. Browser 510 may be configured to render a display based on Page 514, execute client-side code defined in Page 514, enable navigation between pages, or the like.

Browser Extension 510*e* may be a code element executed by Browser 510 to augment the functionality thereof. In some exemplary embodiments, Browser Extension 510*e* may be utilized to fetch Page 514 to be used as part of a demo. In some exemplary embodiments, Browser Extension 510*e* may be configured to create Shallow Copy 514*c* based on Page 514. Additionally, or alternatively, Shallow Copy 514*c* may be created by a remote process, executed externally to Client Device 500, such as using Editor Server 530 that may be configured to provide an editor web-based system. Shallow Copy 514*c* may be based on Page 514. In some cases, Shallow Copy 514*c* may be transmitted to Demo Server 540, which may make Shallow Copies 545 available for usage. In some cases, Shallow Copies 545, such as Shallow Copy 514*c*, may comprise or point to Page-Specific Modifications 516*a*, Object-Specific Modifications 516*b*, or the like. In some exemplary embodiments, Demo Server 540 may include a demo engine (not shown). The demo engine may be served to Client Device 500 for playing the demo on the Client Device 500. Additionally, or alternatively, the demo engine may enable playing the demo by creating the HTML pages to be provided to the Client Device 500, while being executed on Demo Server 540. In some exemplary embodiments, the output of the demo engine may be finalized HTML pages that are viewable by a browser. In some exemplary embodiments, the output HTML pages may exclude any client-side code. In some exemplary embodiments, even if some client-side code is included in the output HTML pages, such client-side code may exclude any business logic of the web-based system.

In some exemplary embodiments, each shallow copy of a multi-page demo may comprise or point to Page-Specific Modifications 516*a* that are associated specifically with its respective page. In some exemplary embodiments, for each aggregated object defined or customized in the edit (e.g., using Editor Server 530), an Object-Specific Modifications 516*b* may be defined. A shallow copy of each page that is deemed to be associated with the aggregated object (e.g., that includes an element that implements the aggregated object such as Object 150 of FIG. 1A), may include or point to the respective Object-Specific Modifications 516*b*.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
obtaining a multi-page demo, the multi-page demo comprising a plurality of shallow copies of pages of a web-based system, the plurality of shallow copies of the pages of the web-based system are copies of the pages of the web-based system that were stripped from links to a backend of the web-based system, the plurality of shallow copies comprises a first shallow copy and a second shallow copy, wherein the multi-page demo is configured to demonstrate capabilities of the web-based system, wherein the plurality of shallow copies is created by capturing HyperText Markup Language (HTML) content of the pages of the web-based system;
obtaining a single instruction to create an aggregated object in the multi-page demo, wherein the single instruction is obtained from an operator via a demo editor, wherein the demo editor is utilized to edit the multi-page demo;
in response to said obtaining the single instruction to create the aggregated object in the multi-page demo, creating the aggregated object in the multi-page demo, said creating is performed by the demo editor;

associating the aggregated object with a first object appearing in the first shallow copy and a second object appearing in the second shallow copy;

in response to one or more edits performed by the operator to the aggregated object via the demo editor, creating object-specific update code representing the one or more edits, wherein the one or more edits are performed in the first shallow copy, wherein the object-specific update code is applicable to all pages of the plurality of shallow copies in which the aggregated object appears; and executing the object-specific update code over at least the first and second shallow copies to edit the first object and the second object according to the one or more edits, thereby updating the multi-page demo.

2. The method of claim 1, wherein the first shallow copy is a shallow copy of a first page of the web-based system, wherein the second shallow copy is a shallow copy of a second page of the web-based system, wherein the first page and the second page are defined based on unified code, wherein the unified code defines that the first object and the second object are instances of a same object, wherein the first page and the second page do not exhibit the fact that the first object and the second object are instances of the same object.

3. The method of claim 1, wherein said executing the object-specific update code is performed during an execution of the multi-page demo.

4. The method of claim 1 further comprises:
displaying the first shallow copy;
acquiring the first object in the first shallow copy; and
applying the object-specific update code on the acquired first object.

5. The method of claim 4 further comprises:
displaying the second shallow copy;
acquiring the second object in the second shallow copy; and
applying the object-specific update code on the acquired second object.

6. The method of claim 5, wherein said acquiring the first object and said acquiring the second object are performed using different acquisition processes.

7. The method of claim 5, wherein the demo editor is configured to define one or more acquisition methods for the aggregated object.

8. The method of claim 5, wherein the demo editor is configured to define for the first shallow copy an acquisition method to be performed for acquiring the first object in the first shallow copy, wherein the acquisition method is defined for the first shallow copy after the demo editor utilizes the acquisition method successfully on the first shallow copy.

9. The method of claim 8, wherein the demo editor is configured to define for the second shallow copy a second acquisition method to be performed for acquiring the second object in the second shallow copy, wherein the second acquisition method is defined for the second shallow copy after the demo editor utilizes the acquisition method unsuccessfully on the second shallow copy and after the demo editor utilizes the second acquisition method successfully on the second shallow copy.

10. The method of claim 4, wherein said acquiring is performed using at least one acquisition method of: an XML Path Language (XPath) statement, or a Cascading Style Sheets (CSS) Selector.

11. The method of claim 4, wherein said applying the object-specific update code on the acquired first object comprises: performing the one or more edits on the acquired first object, wherein the one or more edits comprise one or more object-specific updates that are associated with the aggregated object.

12. The method of claim 4 further comprises applying a customization on one or more objects of the first shallow copy based on customization instructions provided by the operator using the demo editor, wherein said applying the customization on the one or more objects comprises performing one or more page-specific updates that are associated with the first shallow copy.

13. The method of claim 1, wherein the demo editor is configured to display to the operator an active page of the multi-page demo, thereby enabling the operator to customize elements of the active page, wherein the demo editor is configured to display a visual indicator indicating to the operator that an element of the active page is associated with the aggregated object.

14. A system comprising a processor and coupled memory, wherein said system comprises:
a demo editor that is usable by an operator to edit a multi-page demo, the multi-page demo comprising a plurality of shallow copies of pages of a web-based system, the plurality of shallow copies of the pages of the web-based system are copies of the pages of the web-based system that were stripped from links to a backend of the web-based system, the plurality of shallow copies comprises a first shallow copy and a second shallow copy, wherein the multi-page demo is configured to demonstrate capabilities of the web-based system, wherein the plurality of shallow copies is created by capturing HyperText Markup Language (HTML) content of the pages of the web-based system;

said demo editor is configured to obtain a single instruction to create an aggregated object in the multi-page demo, wherein the single instruction is obtained from the operator;

said demo editor is configured to create the aggregated object in the multi-page demo in response to the single instruction;

said demo editor is configured to associate the aggregated object with a first object appearing in the first shallow copy and with a second object appearing in the second shallow copy;

said demo editor is configured to create, in response to one or more edits performed by the operator to the aggregated object, object-specific update code representing the one or more edits, wherein the one or more edits are performed in the first shallow copy, wherein the object-specific update code is applicable to all pages of the plurality of shallow copies in which the aggregated object appears; and said demo editor is configured to execute the object-specific update code over at least the first and second shallow copies to edit the first object and the second object according to the one or more edits, thereby updating the multi-page demo.

15. The system of claim 14, wherein the first shallow copy is a shallow copy of a first page of the web-based system, wherein the second shallow copy is a shallow copy of a second page of the web-based system, wherein the first page and the second page are defined based on unified code that defines that the first object and the second object are instances of a same object.

16. The system of claim 14,
wherein said demo editor is configured to enable the operator to select an active page of the multi-page demo to be displayed, wherein in response to an operator selection of the first shallow copy as the active page, said demo editor is configured to:
acquire the first object in the first shallow copy,
apply the object-specific update code on the acquired first object, thereby obtaining a customized first object,
display he first shallow copy with a-the customized first object to the operator, and
enable the operator to further customize the first shallow copy and the aggregated object;
wherein in response to an operator selection of the second shallow copy as the active page, said demo editor is configured to:
acquire the second object in the second shallow copy,
apply the object-specific update code on the acquired second object, thereby obtaining a customized second object,
display the second shallow copy with the customized second object to the operator, and
enable the operator to further customize the second shallow copy and the aggregated object.

17. The system of claim 16, wherein said demo editor utilizing an acquisition module for acquiring objects, wherein said acquisition module is configured to acquire the first object and the second object using different acquisition processes.

18. The system of claim 17, wherein said acquisition module is configured to attempt to acquire objects that correspond to the aggregated object by utilizing a plurality of acquisition processes defined with a deterministic order therebetween.

19. The system of claim 14 further comprises a demo engine configured to play the multi-page demo, the demo engine is configured to apply a first set of one or more updates when displaying the first shallow copy and a second set of one or more updates when displaying the second shallow copy, wherein the first set of one or more updates comprise one or more page-specific updates associated with the first shallow copy and one or more object-specific updates associated with the aggregated object, wherein the second set of one or more updates comprise one or more page-specific updates associated with the second shallow copy and the one or more object-specific updates that are associated with the aggregated object, wherein the one or more object-specific updates comprise the object-specific update code.

20. The system of claim 19, wherein said demo editor is configured to create duplicative copies of the object-specific update code to be utilized by said demo engine, wherein said demo engine is unaware of a logical association between different implementations of the same aggregated object in different pages when playing the multi-page demo.

* * * * *